M. B. MILLS.
WEIGHT SUPPORTING PLATFORM.
APPLICATION FILED SEPT 4, 1920.
1,384,478.
Patented July 12, 1921.
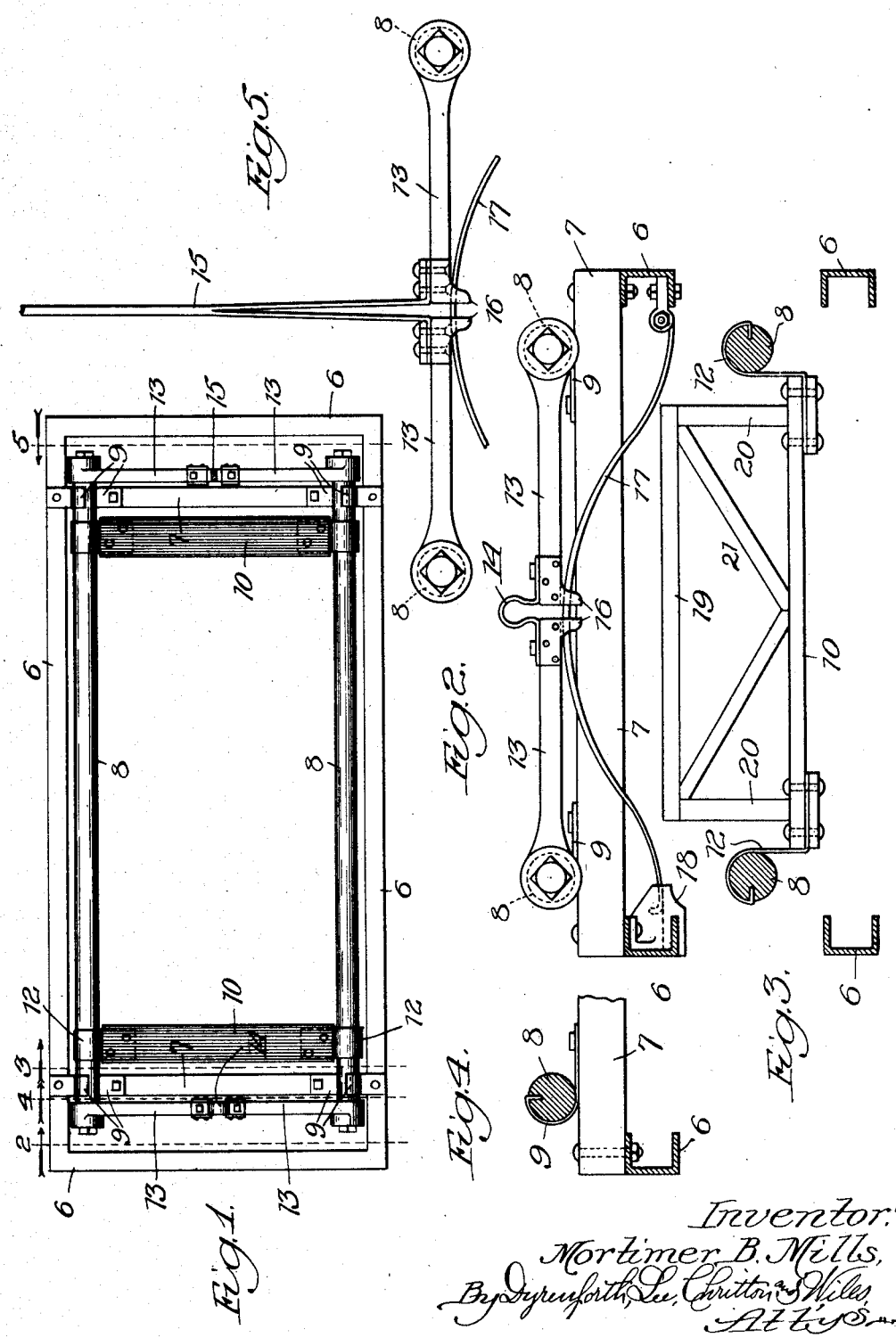
Inventor:
Mortimer B. Mills,
By Dyrenforth, Lee, Chritton & Wiles
Attys.

UNITED STATES PATENT OFFICE.

MORTIMER B. MILLS, OF CHICAGO, ILLINOIS.

WEIGHT-SUPPORTING PLATFORM.

1,384,478.  Specification of Letters Patent.  Patented July 12, 1921.

Application filed September 4, 1920. Serial No. 408,312.

*To all whom it may concern:*

Be it known that I, MORTIMER B. MILLS, a citizen of the United States, residing at 431 Long avenue, Chicago, in the county of Cook and State of Illinois, have invented a new and useful Improvement in Weight-Supporting Platforms, of which the following is a specification.

The primary object of my invention is to provide a weight-supporting yielding platform, such as is used, for example, in weighing scales, (though my invention is adaptable to other uses, as hereinafter referred to), which shall involve as its basic principle of operation that of uniformly distributing over the entire area of the platform the weight of an object placed on any part thereof.

I have more immediately designed my invention for weighing-scales of the so-called platform type and therefore hereinafter describe the construction and operation thereof mainly for that particular use, though without intending to confine it thereto.

It is a general fault in platform scales of all varieties, and in all sizes thereof from scales for weighing small objects to those for weighing large or heavy loads, that accuracy of the weight-indication on the scale, though the latter be otherwise in correctly operative condition, depends upon the object to be weighed being so positioned or centralized upon the platform as to cause the resultant depression of the latter to be uniformly equal throughout to maintain the platform in true horizontal position under the weight of the load. If in a small scale, the object to be weighed be imposed off center or at or near any corner of the platform, or in a large scale, as a road-scale for weighing loaded wagons, freight cars, and the like, the weight be not properly centralized on the platform, the latter will not remain in true horizontal position under the stress of the load, but will tilt under the depression and cause faulty indication of the weight on the scale-beam or scale-dial.

The faulty operation referred to is overcome by my invention, an embodiment of which, suitable for application to a weighing scale, is illustrated in the accompanying drawing, in which:

Figure 1 is a plan view of the base and mechanism thereon for supporting the platform proper, the latter being omitted to uncover the mechanism; and Figs. 2, 3, 4 and 5 are enlarged sections taken respectively on the lines 2, 3, 4 and 5 of the first-named figure.

The base is shown in the form of a rectangular frame 6, from side to side of which near its opposite ends extend, parallel with each other, rails 7, 7, or cross-pieces rigidly secured at their ends to the frame-sides. Cylindrical rollers 8, 8 extend, in parallel relation to each other, across these rails near their opposite ends and each roller is rotatably connected with the rail on which it bears, and thus near each roller-end, by a flat-metal spring 9 having one end fastened down upon the rail and extending thence, in the sense of winding, partway about the adjacent section of the roller, from beneath the latter, to which it is securely fastened, as by the means shown. Along the inner face of each rail 7, and spaced therefrom, extends a flat bar 10 suspended at each of its ends from the respectively adjacent roller by a flat-metal spring 12, which passes at its outer end, in the sense of winding, partway about the adjacent roller, from above the latter, and is secured thereto.

As will be seen, when the rollers are turned, under depression of the bars 10, as and for the purpose hereinafter explained, the springs 9 act in the direction of winding and the springs 12 act in the direction of unwinding, by turning the rollers, toward each other above their axes, and vice versa when the rollers are turned in the opposite direction above their axes.

Arms 13, 13 project from the ends of each roller, to which they are rigidly fastened, these arms forming pairs, one pair having its members connected at their inner ends by a short spring 14, shown in loop form, and the members of the opposite pair being similarly connected by a longer spring 15 to be connected at its upper, rod-like end with a scale-beam (not shown). A pair of ears 16 depends from the inner end of each arm to embrace transversely a spring 17, for holding it against lateral swaying, each of these two springs being fastened at one end to a side of the frame 6 and extending at its opposite end into a socket-piece 18 on the opposite frame-side, to be loosely confined in the socket for adapting the confined end to slip under the resilient movement of the spring. However, neither spring 17 is necessary in the application of my invention to a weighing scale, and they may be wholly dispensed with in that connection.

The platform proper, as shown at 19 in Fig. 3, is raised on side-pieces 20, which extend crosswise of the spring bars 10 for seating the platform thereon; and the box-like platform structure is shown to be reinforced by braces 21 extending inclinedly from the box-corners to meet on the platform-seating bars. These side-pieces and braces may be omitted, however, and the platform may rest flatwise directly upon the seating bars 10.

An object to be weighed imposed for the purpose on the platform 19 will depress it and the weight may, in usual manner, be indicated on the scale-beam, referred to, or on a dial (not shown). By reason of the platform being on a rocking support afforded by the rollers 8, its extent of depression under the weight of the imposed object will of necessity be uniform throughout, irrespective of the position of the object imposed thereon, meaning whether it be centralized or off center, since the resultant movement of the platform-seating springbars 10 is unavoidably uniform throughout their length, they being controlled by the simultaneous corresponding extent of turning of the rollers because of their connection with the bar-ends. As will therefore be apparent, the depression of the platform 19 being thus equal throughout, the weight thereon distributes itself uniformly over its entire area in any position in which it may be imposed thereon, and the accomplishment of my aforesaid primary object ensues.

The principle of operation of my invention renders it applicable with advantage to yielding platforms or floors generally, which tend to sag under loads not uniformly distributed thereon, as is the case, for example, with trucks, wagons, automobiles and other vehicles; and I desire to be understood as intending my invention for all uses to which it may be advantageously applicable.

I realize that considerable variation is possible in the details of construction thus specifically shown and described, and I do not intend by illustrating a single specific or preferred embodiment of my invention to be limited thereto, my intention being in the appended claims to claim protection for all there may be of novelty in my invention as broadly as the state of the art will permit.

I claim:

1. In combination with a base, rails secured thereon, rollers rotatably bearing on said rails, springs extending from the rails and winding in one direction about and secured to the rollers, seat-forming bars suspended at their ends by springs winding in the opposite direction about and secured to the rollers, and a weight-supporting platform on said bars.

2. In combination with a base, rollers rotatably and confinedly supported thereon, arms projecting toward each other from the rollers and flexibly connected at their adjacent ends, springs on the base resiliently supporting said arms at their connected ends, and a weight-supporting platform depressibly carried by said rollers to move bodily with the rollers in turning.

3. In combination with a base, rails secured thereon, rollers rotatably bearing on said rails, springs extending from the rails and winding in one direction about and secured to the rollers, a platform-seat having its opposite ends connected with the rollers by springs extending from said seat and winding in the opposite direction about and secured to the rollers, a weight-supporting platform on said seat, and arms projecting toward each other from the rollers and flexibly connected at their adjacent ends.

4. In combination with a base, rails secured thereon, rollers rotatably bearing on said rails, springs extending from the rails and winding in one direction about and secured to the rollers, a platform-seat having its opposite ends connected with the rollers by springs extending from said seat and winding in the opposite direction about and secured to the rollers, a weight-supporting platform on said seat, arms projecting toward each other from the rollers and flexibly connected at their adjacent ends, and a spring on the base resiliently supporting the arms at their connected ends.

MORTIMER B. MILLS.